United States Patent
Zhao et al.

(10) Patent No.: US 10,897,428 B2
(45) Date of Patent: Jan. 19, 2021

(54) METHOD, SERVER SYSTEM AND COMPUTER PROGRAM PRODUCT FOR MANAGING RESOURCES

(71) Applicant: EMC IP Holding Company, Hopkinton, MA (US)

(72) Inventors: Junping Zhao, Beijing (CN); Fan Guo, Shanghai (CN); Kun Wang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 93 days.

(21) Appl. No.: 16/166,543

(22) Filed: Oct. 22, 2018

(65) Prior Publication Data
US 2019/0132257 A1     May 2, 2019

(30) Foreign Application Priority Data

Oct. 27, 2017 (CN) .......................... 2017 1 1029488

(51) Int. Cl.
*H04L 12/927* (2013.01)
*H04L 12/911* (2013.01)
*G06F 9/50* (2006.01)

(52) U.S. Cl.
CPC ............ *H04L 47/803* (2013.01); *G06F 9/505* (2013.01); *G06F 9/5088* (2013.01); *G06F 2209/5021* (2013.01); *G06F 2209/5022* (2013.01); *H04L 47/74* (2013.01); *H04L 47/821* (2013.01); *H04L 47/822* (2013.01)

(58) Field of Classification Search
CPC ....... H04L 47/803; G06F 9/505; G06F 9/5088
See application file for complete search history.

(56) References Cited

U.S. PATENT DOCUMENTS

| 7,868,891 | B2 * | 1/2011 | Wexler ...................... G06T 1/20 345/503 |
| 8,217,951 | B2 * | 7/2012 | Jung ........................ G06F 9/505 345/505 |
| 8,566,537 | B2 * | 10/2013 | Ni .......................... G06F 15/167 711/137 |
| 8,669,990 | B2 * | 3/2014 | Sprangle ................... G06T 1/20 345/522 |
| 8,830,245 | B2 * | 9/2014 | Bone ...................... H04L 67/10 345/502 |
| 9,830,678 | B2 * | 11/2017 | Gandhi ..................... G06T 1/20 |
| 10,445,850 | B2 * | 10/2019 | Min .................... H04L 43/0876 |

\* cited by examiner

*Primary Examiner* — Esther B. Henderson
*Assistant Examiner* — Nazia Naoreen
(74) *Attorney, Agent, or Firm* — Ryan, Mason & Lewis, LLP

(57) ABSTRACT

Embodiments of the present disclosure provide a method, a server system and a computer program product of managing resources. The method may comprise receiving a request for a first amount of resources of the dedicated processing unit from an application with an assigned priority. The method may further comprise determining a total amount of resources of the dedicated processing unit to be occupied by the application based on the request. The method may also comprise in response to the total amount approximating or exceeding a predetermined quota associated with the priority, allocating the first amount of resources of the general-purpose processing unit to the application.

20 Claims, 5 Drawing Sheets

METHOD, SERVER SYSTEM AND COMPUTER PROGRAM PRODUCT FOR MANAGING RESOURCES

RELATED APPLICATIONS

This application claims priority from Chinese Patent Application Number CN 201711029488.0, filed on Oct. 27, 2017 at the State Intellectual Property Office, China, titled "A METHOD FOR MANAGING RESOURCE, A SERVER SYSTEM AND A COMPUTER PROGRAM PRODUCT" the contents of which are incorporated by reference in their entirety.

FIELD

Embodiments of the present disclosure relate to the computer field, and more specifically, to a method, a server system and a computer program product for managing resources.

BACKGROUND

Many data processing and computing tasks today are dependent on the dedicated processor. For example, Graphics Processing Unit (GPU) is a known dedicated processor for accelerating computation on a personal computer, a workstation, a game machine and a mobile device. The GPU accelerated computation can be provided by using GPU and a Central Processing Unit (CPU) simultaneously. The GPU accelerated computation can transfer computing-intensive workload of the application to the GPU, while the remaining program codes can still be executed by the CPU. From the perspective of users, the operating speed of the application is obviously accelerated.

Nowadays, in order to provide better service for computing-intensive tasks, such as high performance computing (HPC), machine learning (ML), deep learning (DL) and the like, a growing number of public clouds or data centers are starting to deploy GPU instances for the computing-intensive tasks to use. The GPU instances deployed by the public cloud or data center are shared by applications of different tenants. However, the public cloud or data center is just trying to deploy the GPU instances and it is currently at the initial phase. So far, there lacks a solution of Quality of Service (QoS) control over resources in the shared GPU among a plurality of applications. Other types of dedicated processors also face a similar problem.

SUMMARY

Embodiments of the present disclosure provide a solution for managing resources.

In the first aspect of the present disclosure, there is provided a method for managing resources. The method can comprise receiving a request for a first amount of resources of a dedicated processing unit from an application, the application with an assigned priority. The method can further comprise determining, based on the request, a total amount of resources of the dedicated processing unit to be occupied by the application. The method can also comprise in response to the total amount approximating or exceeding a predetermined quota associated with the priority, allocating the first amount of resources of the general-purpose processing unit to the application.

In a second aspect of the present disclosure, there is provided a server system. The server system can comprise a dedicated processing unit, a general-purpose processing unit and a controller. The controller can be configured to receive a request for a first amount of resources of the dedicated processing unit from an application with an assigned priority. The controller can also be configured to determine, based on the request, a total amount of resources of the dedicated processing unit to be occupied by the application. The controller can further be configured to in response to the total amount approximating or exceeding a predetermined quota associated with the priority, allocate the first amount of resources of the general-purpose processing unit to the application.

In a third aspect of the present disclosure, there is provided a computer program product tangibly stored on a non-volatile computer readable medium and including machine executable instructions, which, upon execution, cause a machine to execute steps of the above described method for managing resources.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Figure 1:
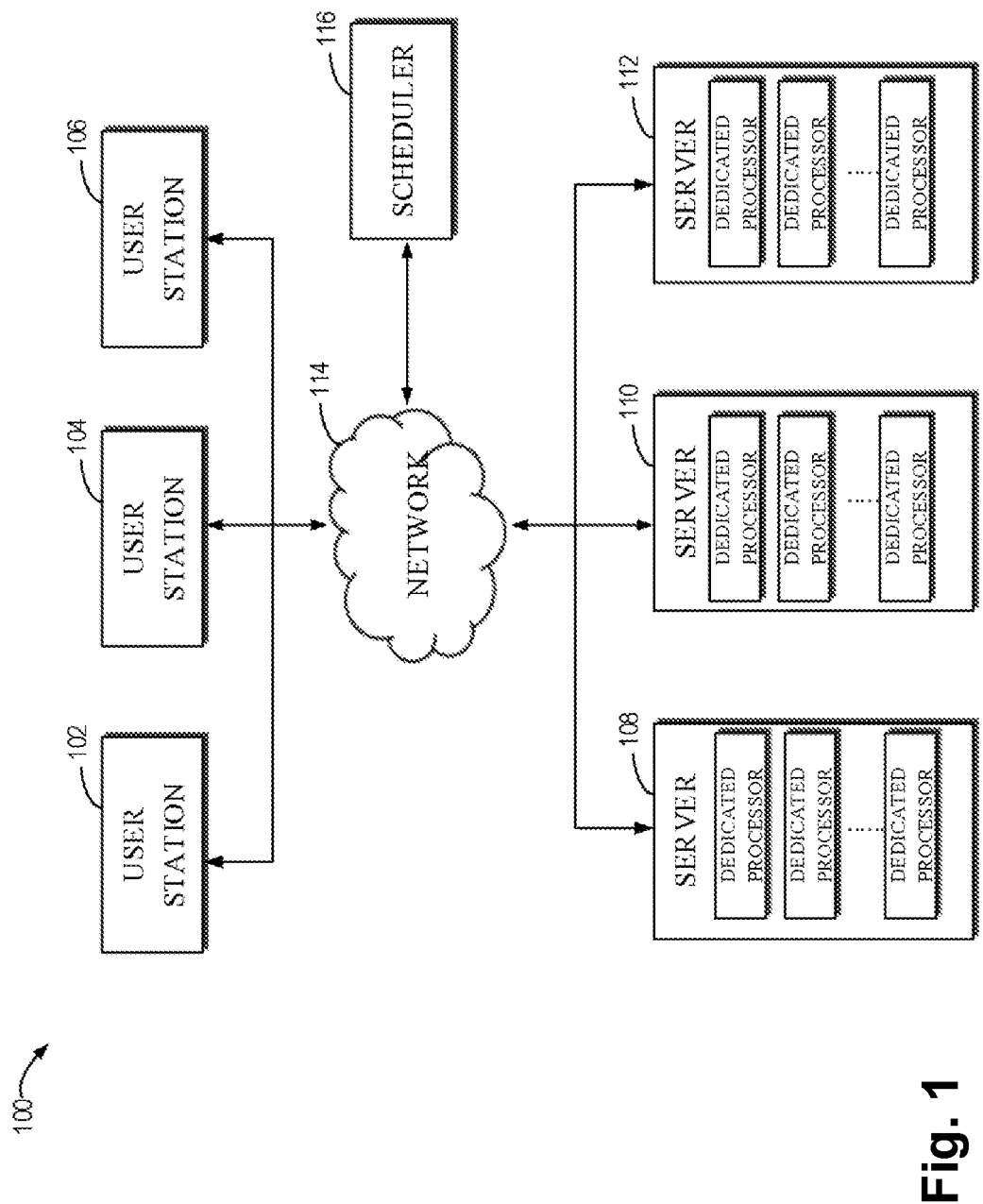
FIG. 1 illustrates an environment for providing a shared dedicated processor to a plurality of applications.

The principles of the present disclosure will be described with reference to the several example embodiments shown in the drawings. Although the drawings illustrate example embodiments of the present disclosure, it should be understood that the embodiments are described merely to enable those skilled in the art to better understand and further implement the present disclosure and is not intended for limiting the scope of the present disclosure in any manner.

FIG. 1 illustrates an environment 100 for providing a shared dedicated processor to a plurality of applications. The environment 100, for example, can be cloud-based environment. As shown in FIG. 1, the environment 100 includes a first user station 102, a second user station 104, a third user station 106, a first server 108, a second server 110, a third server 112, a network 114 and a scheduler 116. Although FIG. 1 illustrates three user stations 102, 104 and 106 and three servers 108, 110 and 112, those skilled in the art will understand that the environment 100 can include any number of user stations and any number of servers.

The user stations 102, 104 and 106 may be user equipment connected to the servers 108, 110 and 112 via the network 114, such as a desktop computer, a laptop computer, a tablet computer, a smartphone and the like. The user stations 102, 104 and 106 may have client applications running thereon. For example and without limitation, a high performance computing (HPC) application can run on the first user station 102, a machine learning (ML) application can run on the second user station 104, and a deep learning (DL) application can run on the third user station 106.

The first server 108, the second server 110 and the third server 112 provide a shared dedicated processor for applications running on the user stations 102, 104 and 106, such as a shared GPU, a shared Field Programmable Gate Array (FPGA) and the like, to provide accelerated computing. Each of the servers 108, 110 and 112 can include one or more dedicated processors. In addition to the dedicated processor, each of the servers 108, 110 and 112 can include other components not shown, for example, a general-purpose processor such as a central processing unit (CPU), a storage system and so on. The scheduler 116 can be responsible for allocating dedicated processors in the servers 108, 110 and 112 to client applications running on the user stations 102, 104 and 106.

In the environment having a shared dedicated processor, such as the environment 100 shown in FIG. 1, a plurality of applications (e.g., HPC application, ML application, DL application) from same or different tenants may be present simultaneously and run in the same dedicated processor. A problem that needs to be settled is how to enable the plurality applications to efficiently utilize such shared dedicated processor, especially how to efficiently utilize resources in the shared dedicated processor. However, there still lacks an effective solution of providing Quality of Service (QoS) control of the dedicated processor for a plurality of applications so far. Besides, although the usage of resources can be queried through some Application Program Interfaces (API) in the current hardware architecture of the dedicated processor, there still lacks an application-level QoS control capability.

Regarding this, the embodiments of the present disclosure generally provide a solution for managing resources of a dedicated processing unit, to facilitate applications with higher priority or tenants with higher service-level agreement to easily acquire resources of the dedicated processing unit and try to minimize impacts on each application program in terms of code, rebuild or running results.

In the embodiments of the present disclosure, a predetermined quota associated with a priority of an application is set for the application and the predetermined quota increases with the increase of the priority. The predetermined quota indicates an upper limit of the resources allowed for use by the application in the dedicated processing unit. In response to receiving a request for resources (such as storage resources) of the dedicated processing unit from the application, the request is parsed to acquire the requested amount of resources. Based on the requested amount of resources and the amount of resources already occupied by the application, the total amount of resources to be occupied by the application in the dedicated processing unit is determined. If the total amount of resources is close to or exceeds the predetermined quota, no resource of the dedicated processing unit is allocated to the application. Instead, a part of the resources of a general-purpose processing unit (such as central processing unit (CPU)) is allocated to the application based on the requested amount of resources.

By setting a quota associated with the priority of the application for the application, it can be ensured that the application with higher priority can acquire more resources of the dedicated processing unit than the application with lower priority, such that the application with lower priority will have a small influence on the application with higher priority. On the other hand, if the request for the resources of the dedicated processing unit causes the total amount of resources to be occupied by the application in the dedicated processing unit to be close to or exceed the predetermined quota, the resources of the general-purpose processing unit is allocated to the application. This ensures continued running of the application to obtain the running result while satisfying the quota.

In the following description with reference to FIGS. 2 and 3, for clarity and brevity, example embodiments of the present disclosure will be described in detail by mainly taking GPU as an example. It is known that GPU is a common dedicated processor and its strong computational capability originates from its massive cores and high bandwidth memory. The memory of GPU is an important rare resource of the GPU. The memory of GPU normally has a small capacity, such as 8 GB-16 GB, but its throughput is extremely high, up to 900 GB/s for example. The memory of GPU plays a vital role for many GPU applications as data loading and movement may seriously affect the application performance.

However, it should be understood that GPU is only an exemplary dedicated processor and is not intended for limiting the scope of the present disclosure. Spirit and principles described herein can also be applied to other dedicated processors, for example an accelerator such as a Field Programmable Gate Array (FPGA), regardless of whether it is currently employed or to be developed, and the embodiments of the present disclosure should not be restricted to GPU only.

Figure 2:
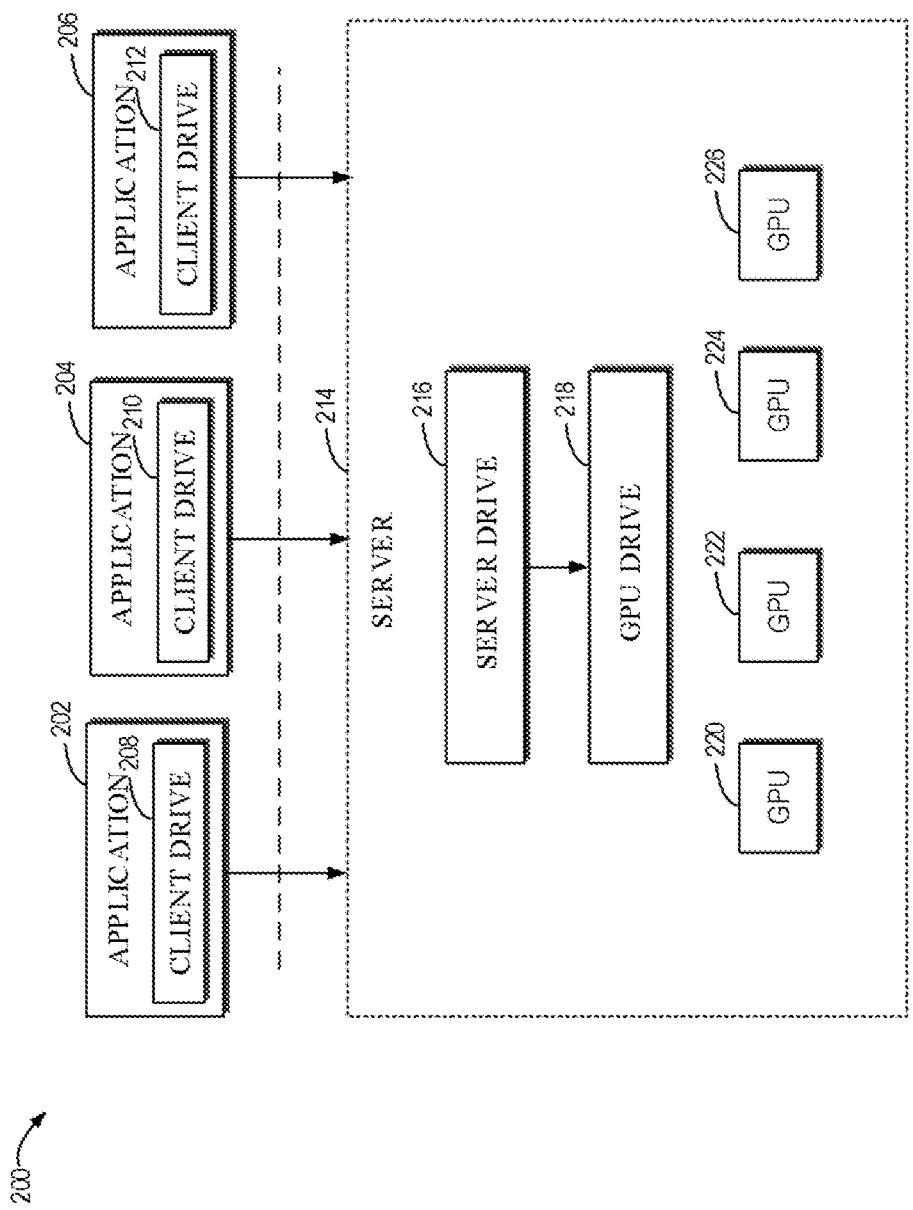
FIG. 2 illustrates a schematic diagram of architecture according to embodiments of the present disclosure.

FIG. 2 illustrates a schematic diagram of architecture 200 according to embodiments of the present disclosure. It should be understood that some components shown in FIG. 2 can be omitted and in other embodiments, the architecture 200 can also comprise other components not shown herein. That is, the schematic diagram described in FIG. 2 is only for describing the embodiments of the present disclosure in an example environment to facilitate those skilled in the art to understand the mechanisms and the principles described herein without any intentions of limiting the scope of the present disclosure in any manner.

The architecture 200 includes a first application 202, a second application 204, a third application 206 and a server 214. The applications 202, 204 and 206 may be GPU applications developed by same or different tenants, such as high performance computing (HPC) application, machine learning (ML) application, deep learning (DL) application and the like. The computing-intensive part of each of the first application 202, the second application 204 and the third application 206 can be executed by one or more of GPU 220, 222, 224 and 226 in the server 214.

A tenant can set, based on its service-level agreement, a predetermined quota for its application. In one embodiment, the predetermined quota increases with the increase of the service-level agreement. The service-level agreement reflects a priority of the application. The predetermined quota can be set in different ways, for example, in an absolute or relative manner. In one embodiment, there may have three quota types. In type 1, the quota is an absolute number, such as 4 GB storage resources. In type 2, the quota is a proportion of the total GPU resources, for example, 50% of the total GPU storage resources. In type 3, the quota is a proportion of the available GPU resources, e.g., 50% of the available GPU storage resources.

The applications 202, 204 and 206 can send its quota setting to the server 214. Just as an example, in one embodiment, the applications 202, 204 and 206 can send the quota setting to the server 214 in a predefined request format <AppID, quotaType, quotaSetting> in response to the first launch. AppID indicates an identifier of the application and each application may have one unique identifier. QuotaType indicates the quota type, such as the above described type 1, type 2 or type 3. QuotaSetting indicates the value of the quota, e.g., 4 GB or 50%.

Under the architecture 200, the applications 202, 204 and 206 each internally and dynamically load one client drive, such as client drive 208, 210 and 212. The client drive can intercept all requests associated with GPU from the respective application e.g., requests for the resources of the GPU (such as storage resources), and forward the intercepted requests to the server 214 for processing. The applications 202, 204 and 206 intercept requests associated with GPU by respectively loading the client drives 208, 210 and 212 in a dynamic fashion, and interact with the server 214 to implement solution of the present disclosure without modifying the codes. Therefore, the solution of the present disclosure is transparent from the view of the application.

The server 214 includes a server drive 216, a GPU drive 218 and a plurality of GPUs 220, 222, 224 and 226. The GPU drive 218 is similar to the conventional GPU drive and will not be described in detail here. The server drive 216 can receive a request in the format of <AppID, quotaType, quotaSetting> from the application, and extract information associated with the quota from the request.

The server drive 216 can also maintain the following information for each application: an identifier of the application; a quota type, such as the above described type 1, type 2 or type 3; a quota value, which may be an absolute value or a relative value; the amount of utilized GPU resources, which may be an absolute value or a relative value; a policy employed when the total amount of resources to be occupied by the application exceeds the predetermined quota, such as strategy suspending policy, a post-penalty policy, a remapping policy etc. These policies will be described in detail below. Apart from the above information, the server drive 216 can also maintain system level information, including total amount of GPU resources of the system and amount of already utilized GPU resources or utilization of GPU resources.

The server drive 216 can also receive a request for a first amount of GPU resources from any one (such as the first application 202) of the first application 202, the second application 204 and the third application 206. The server drive 216 determines, based on the request and the maintained amount of resources already utilized by the first application 202 in the GPU, the total amount of GPU resources to be utilized by the first application 202. In response to the total amount of GPU resources to be utilized by the first application 202 approximating or exceeding the predetermined quota associated with the first application 202, e.g., the total amount to be utilized reaching a certain proportion of the predetermined quota (such as 90% or any other appropriate value), the server drive 216 adopts the corresponding policy.

In one embodiment of the present disclosure, in response to the total amount of GPU resources to be utilized by the first application 202 approximating or exceeding the predetermined quota, the policy adopted by the server drive 216 is to allocate a first amount of resources of the general-purpose processing unit (e.g., CPU), such as CPU DRAM to the first application 202, instead of allocating any portion of the GPU resources to the first application 202. For instance, CPU has storage resources with a larger capacity and lower cost than GPU. Accordingly, it can be ensured that the first application 202 is able to continue running while the GPU resources occupied by the first application will not exceed the predetermined quota.

For example, the GPU resources can include storage resources of GPU and CPU resources can include storage resources of CPU. The storage resources of GPU and the storage resources of CPU have unified addressing by means of a shared pointer. For example without limitation, the unified addressing of the address space of the GPU memory and the CPU memory can be implemented by using an underlying drive specific to the GPU manufacturer. The unified addressing of the address space of the GPU memory and the CPU memory can also be implemented at the operation system level. In the example, the server drive 216 can set the shared pointer to point to the allocated storage resources of CPU and return the information of the pointer to the first application 202 for its use. Because the storage resources of GPU and the storage resources of CPU are addressed with the same pointer, the application does not know the storage resources allocated to it is in fact storage resources of CPU from the perspective of the application, i.e., the application can transparently access storage resources of GPU and storage resources of CPU.

In the example, apart from the above described information maintained by the server drive 216, the server drive 216 also maintains additional metadata, which can include: an indication of memory type; an indication of storage location of data (e.g., whether the data is stored in GPU or CPU); and an indication which GPU the data is initially expected to be stored on.

The server drive 216 can determine, in response to the first application 202 releasing a portion of the GPU resources occupied previously, whether the total amount of GPU resources occupied by the first application after releasing the portion is below the predetermined quota by a threshold difference, such as at least lower than the predetermined quota by 10% or any other appropriate value. In response to the total amount after releasing being below the predetermined quota by the threshold difference, the server drive 216 migrates at least a portion of the data that occupies the allocated resources of the general-purpose processing unit to the GPU resources. In this way, it can be ensured that the data (such as frequently accessed data) processed or accessed by the first application 202 can be on the GPU, so as to expedite processing of the data or access to the data.

In one embodiment of the present disclosure, in response to the total amount of GPU resources to be utilized by the first application 202 approximating or exceeding the predetermined quota associated with the first application 202, the policy adopted by the server drive 216 is to allocate the requested amount of GPU resources to the first application 202 to satisfy the current need of the first application 202. However, in response to the first application 202 completing the related operations using the allocated GPU resources, the policy may cause the first application 202 to sleep for a time period. The length of the time period is positively correlated with the difference value of the amount of utilized GPU resources exceeding the predetermined quota, i.e., the more the amount of utilized GPU resources exceeds the predetermined quota, the longer the first application 202 will sleep. Thus, the fair use of the GPU resources by each application

202, 204 and 206 can be implemented while ensuring continued running of the first application 202.

In another embodiment of the present disclosure, in response to the total amount of GPU resources to be utilized by the first application 202 approximating or exceeding the predetermined quota associated with the first application 202, the policy adopted by the server drive 216 is to suspend the first application 202 until the first application 202 releases a portion of the already utilized GPU resources.

The Quality of Service (QoS) control of the GPU resources at the server side is described above. In a further embodiment of the present disclosure, QoS of the GPU resources can be controlled at the client side. For example, each of the client driver 208, 210 and 212 can acquire utilization of GPUs 220, 222, 224 and 226 at the server 214. In response to the utilization constantly exceeding a threshold within a period of time, the client driver 208, 210 and 212 can place the intercepted requests associated with GPU in a queue instead of immediately sending them to the server 214, so as to reduce pressure at the server 214.

It is also possible to coordinately implement QoS control of the GPU resources at both the server side and the client side. Such control manner will be described below with reference to FIG. 3. FIG. 3 illustrates a schematic diagram of architecture 300 according to embodiments of the present disclosure. The architecture 300 includes a first application 302, a second application 304, a third application 306 and a server 314. The first application 302 is provided with a queue 308, the second application is provided with a queue 310, and the third application is provided with a queue 312.

The server 314 includes a resource monitoring module 316 and a plurality of GPUs 318, 320, 322 and 324. Under the architecture 300, the client side initially employs no control measures. So the first application 302, the second application 304 and the third application 306 can continuously transmit requests to the server 314. The resource monitoring module 316 can detect the utilization of the GPUs 318, 320, 322 and 324. In response to the utilization of the GPUs 318, 320, 322 and 324 constantly exceeding a threshold within a period of time, the resource monitoring module 316 can transmit a signal to the application with a lower priority among the first application 302, the second application 304 and the third application 306, to instruct the application to defer sending of subsequent requests for the GPU resources. The application can place the subsequent requests in the corresponding queue in response to receiving the signal. In one embodiment, the resource monitoring module 316 can transmit such signal to all applications 302, 304 and 306, to indicate them to defer sending of subsequent requests for the GPU resources.

In the architecture 300, the resource monitoring module 316, in replacement of the server drive 216 in FIG. 2, can be used to implement the above described function. For example, the resource monitoring module 316 can receive a request for the GPU resources from the first application 302, determine the total amount of GPU resources to be occupied by the first application 302 based on the request, and adopts corresponding policy in response to the total amount of GPU resources to be occupied by the first application 302 exceeding a predetermined quota associated with the first application 302.

Figure 3:
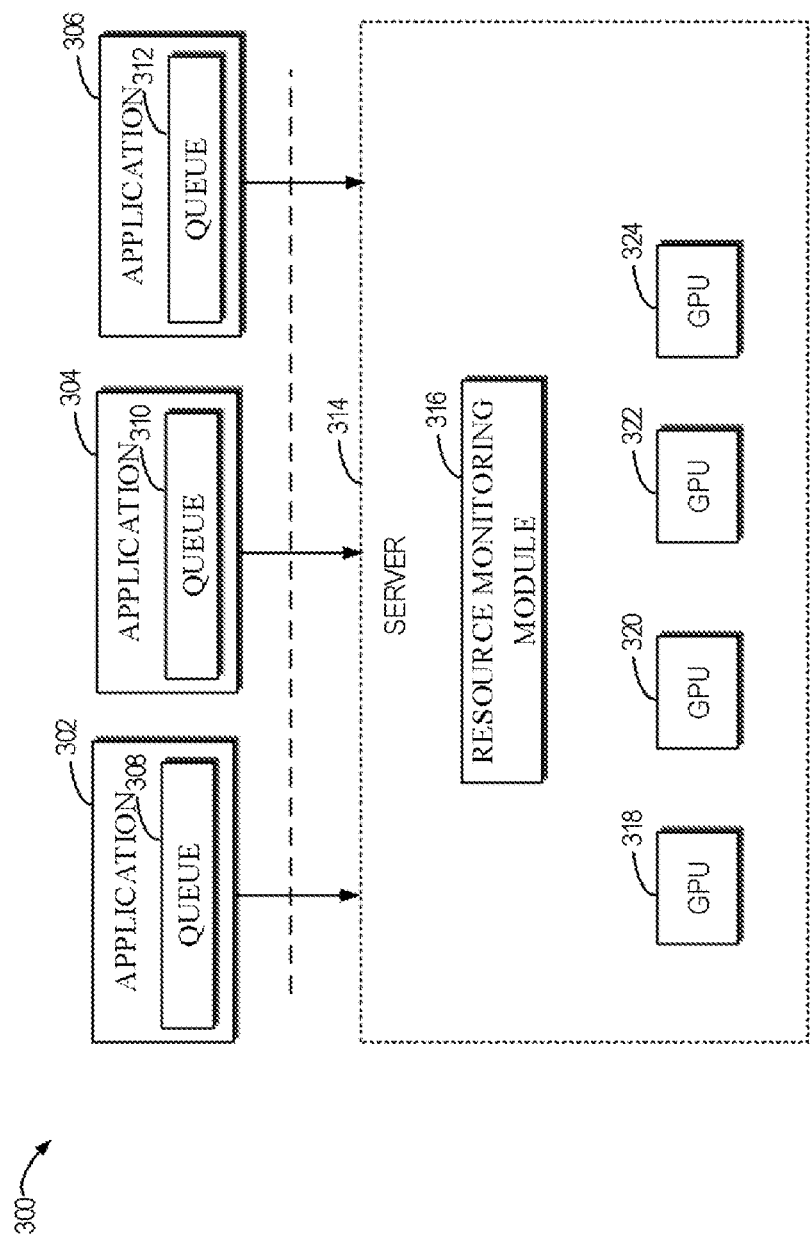
FIG. 3 illustrates a schematic diagram of architecture according to embodiments of the present disclosure.

In the architecture 300 shown by FIG. 3, the client side and the server side collaboratively participate in the management of the GPU resources, such that the control over the Quality of Service (QoS) of the GPU resources is scattered on both the server side and the client side. Thus the burden at the server side can be alleviated, and overloading of the server can be avoided.

Figure 4:
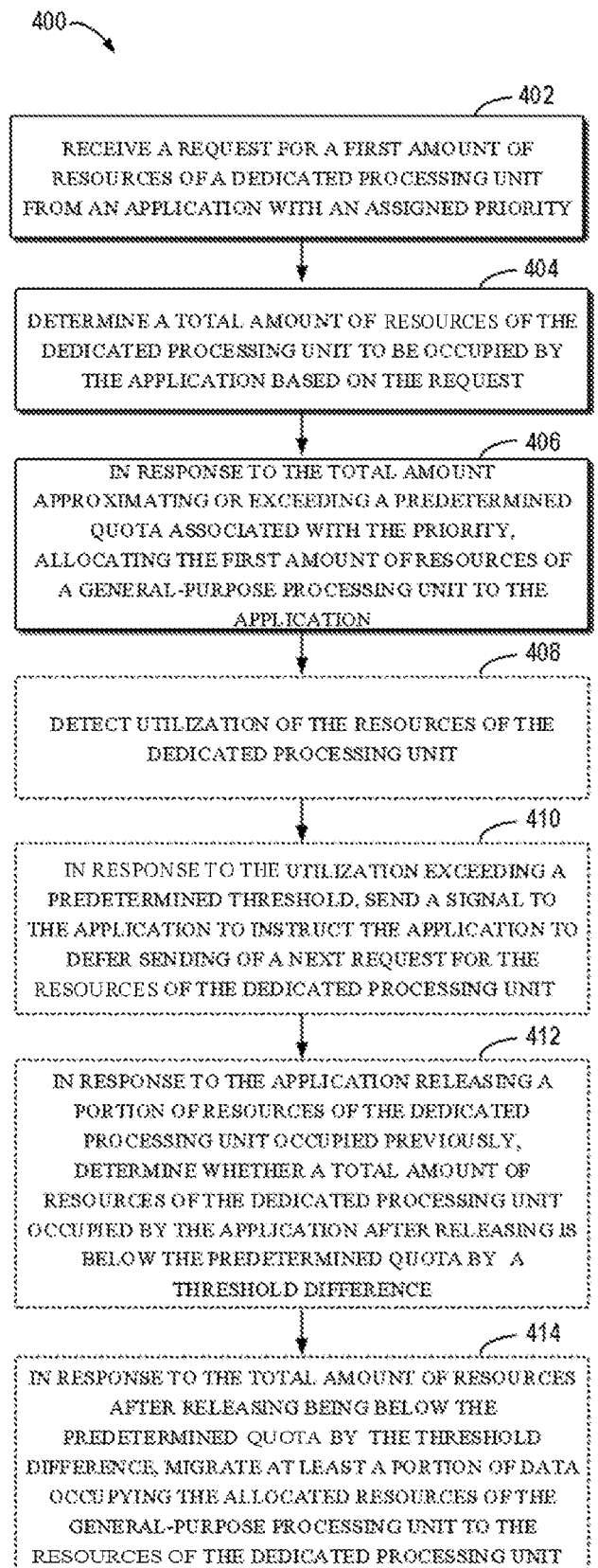
FIG. 4 illustrates a flowchart of a method for managing resources according to embodiments of the present disclosure.

FIG. 4 illustrates a flowchart of a method 400 of managing resources according to embodiments of the present disclosure. The method 400 can be executed by the server drive 216 shown in FIG. 2 or the resource monitoring module 316 shown in FIG. 3.

At block 402, a request for a first amount of resources of a dedicated processing unit is received from an application having an assigned priority. In one embodiment of the present disclosure, the priority of the application is associated with the service-level agreement of the tenant that develops the application. The higher the service-level agreement is, the higher the priority will be. The resources of the dedicated processing unit can include storage resource of GPU or storage resources of an accelerator such as FPGA.

At block 404, the total amount of resources of the dedicated processing unit to be occupied by the application is determined based on the request. In one embodiment of the present disclosure, the total amount is determined based on the requested amount of resources and the amount of resources already occupied by the application in the dedicated processing unit.

At block 406, in response to the determined total amount approximating or exceeding a predetermined quota associated with the priority, a first amount of resources of a general-purpose processing unit is allocated to the application. In one embodiment of the present disclosure, the predetermined quota associated with the priority is set by the tenant that develops the application, and an indication of the predetermined quota is received from the application in advance. For example, when the application is initially launched, it can transmit to the server an indication of the predetermined quota via a request in a predefined format.

In one embodiment of the present disclosure, the resources of the dedicated processing unit may include storage resources of a GPU, and the resources of the general-purpose processing unit resources may include storage resources of a CPU. The resources of the dedicated processing unit and the resources of the general-purpose processing unit may have unified addressing by means of a shared pointer. Allocating a first amount of resources of the general-purpose processing unit to the application may include setting the shared pointer to point to the allocated resources of the general-purpose processing unit, and returning information of the pointer to the application.

In the method 400, the predetermined quota is associated with the assigned priority of the application. It can be ensured that the application with a higher priority can acquire more resources of the dedicated processing unit, such as storage resources of GPU, than the application with a lower priority, such that the application with lower priority will have a small influence on the application with higher priority. On the other hand, if the request for the resources of the dedicated processing unit causes the total amount of resources to be occupied by the application to be close to or exceed the predetermined quota, the required amount of resources is allocated to the application in the general-purpose processing unit. This ensures continued running of the application while satisfying the quota requirement.

In one preferred embodiment of the present disclosure, the method 400 may also include optional blocks 408, 410, 412 and 414. At block 408, utilization of resources of the dedicated processing unit is detected. In response to the utilization exceeding a predetermined threshold, for example, the utilization constantly exceeding the predefined threshold within a period of time, a signal is transmitted to the application to instruct the application to delay the transmission of the next request for resources of the dedicated processing unit at block 410. In this way, the client side also participates in management of resources of the dedicated processing unit, such that the control over the Quality of Service of the resources of the dedicated processing unit resources is scattered on both the server side and the client side. Thus the burden at the server side can be alleviated and overloading of the server can be avoided.

At block 412, in response to the application releasing a portion of the occupied resources of the dedicated processing unit, it can be determined whether the total amount of resources of the dedicated processing unit occupied by the application after releasing is below the predetermined quota by a threshold difference. For example, it can be determined whether the total amount of resources of the dedicated processing unit occupied by the application after releasing is lower than the predetermined quota by at least 10% or any other appropriate value.

At block 414, in response that the total amount of resources of the dedicated processing unit occupied by the application after releasing is below the predetermined quota by the threshold difference, at least a portion of the data that occupies the allocated resources of the general-purpose processing unit is migrated to the resources of the dedicated processing unit. As the application releases a portion of the occupied resources of the dedicated processing unit, the resource pressure at the dedicated processing unit is reduced. In this case, by migrating at least a portion of the data that occupies the resources of the general-purpose processing unit to the resources of the dedicated processing unit, it can be ensured that the data accessed or processed by the application can be locally at the dedicated processing unit, thereby accelerating the processing speed of data.

The solution provided in the present disclosure is tested by two clients concurrently executing matrix multiplication on the shared GPU. The service-level agreement (i.e., priority) of the first client of the two clients is higher than the service-level agreement of the second client. When the solution provided by the present disclosure is not adopted, the time for the first client to complete the matrix multiplication is 177.377 milliseconds and the time for the second client to complete the matrix multiplication is 177.352 milliseconds, and there is almost no difference therebetween.

When the solution provided by the present application is adopted, as the priority of the first client is higher than the second client, the predetermined quota of the first client is higher than the predetermined quota of the second client. Accordingly, the time for the first client to complete the matrix multiplication is 177.954 milliseconds and the time for the second client to complete the matrix multiplication is 360.856 milliseconds, and the difference is significant. In this way, different Quality of Service (QoS) can be provided for the clients with different priority.

Figure 5:
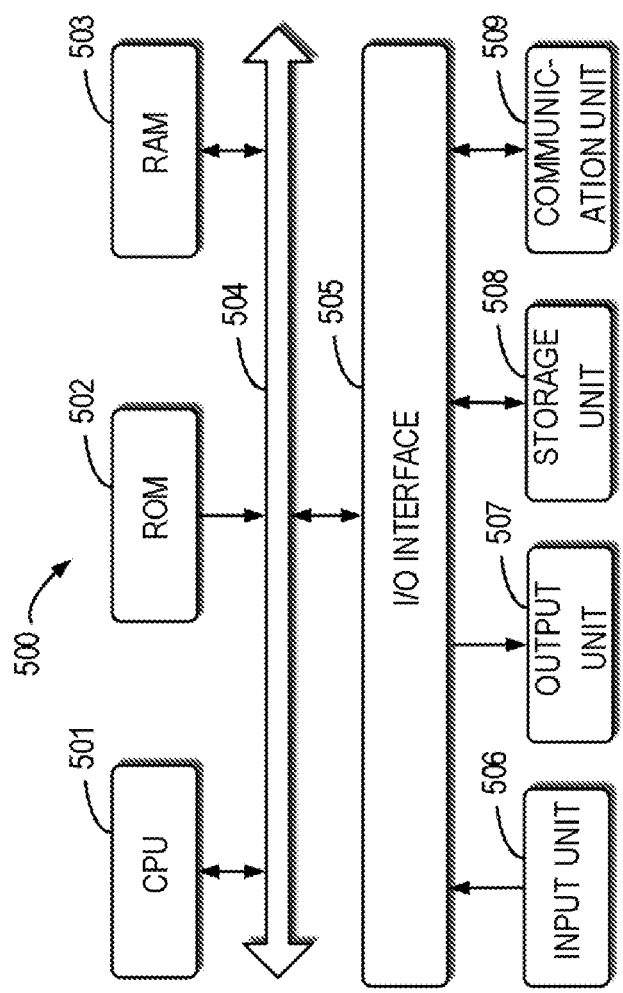
FIG. 5 illustrates a block diagram of an example device for implementing embodiments of the present disclosure.

FIG. 5 illustrates a schematic block diagram of an example device 500 for implementing embodiments of the present disclosure. As shown in FIG. 5, the device 500 comprises a central process unit (CPU) 501, which can execute various suitable actions and processing based on the computer program instructions stored in the read-only memory (ROM) 502 or computer program instructions loaded in the random-access memory (RAM) 503 from a storage unit 508. The RAM 503 can also store all kinds of programs and data required by the operation of the device 500. CPU 501, ROM 502 and RAM 503 are connected to each other via a bus 504. The input/output (I/O) interface 505 is also connected to the bus 504.

A plurality of components in the device 500 is connected to the I/O interface 505, including: an input unit 506, such as keyboard, mouse and the like; an output unit 507, e.g., various kinds of display and loudspeakers etc.; a storage unit 508, such as disk and optical disk etc.; and a communication unit 509, such as network card, modem, wireless transceiver and the like. The communication unit 509 allows the device 500 to exchange information/data with other devices via the computer network, such as Internet, and/or various telecommunication networks.

The processing unit 501 executes the above described various methods and processing, such as method 400. For example, in some embodiments, method 400 can be implemented as a computer software program tangibly included in the machine-readable medium, e.g., storage unit 508. In some embodiments, the computer program can be partially or fully loaded and/or mounted to the apparatus 500 via ROM 502 and/or communication unit 509. When the computer program is loaded to RAM 503 and executed by the CPU 501, one or more steps of the above described method 400 can be implemented. Alternatively, the CPU 501 can be configured to execute method 400 through any other appropriate manners (such as by means of the firmware) in other embodiments.

Those skilled in the art should understand that each step of the above method of the present disclosure can be implemented by a general-purpose computing apparatus. They can be integrated on a single computing apparatus, or distributed on a network consisting of a plurality of computing apparatuses. Optionally, they can be implemented using the executable program codes of the computing apparatus, such that they are stored in the storage apparatus for the execution by the computing apparatus, or they are respectively manufactured into various integrated circuit modules, or multiple modules or steps in them are manufactured into a single integrated circuit module for implementation. Thus, the present disclosure is not restricted to any particular combinations of hardware and software.

It should be understood that although the above detailed description mentions several apparatuses or sub-apparatuses of the device, the division is only exemplary rather than being compulsory. In fact, features and functions of the above described two or more apparatuses can be materialized in one apparatus according to the embodiments of the present disclosure. On the contrary, features and functions of the above described one apparatus can be further divided and materialized by several apparatuses.

The above description is only optional embodiments of the present disclosure, which does not restrict the present disclosure. For those skilled in the art, the present disclosure can have various modifications and alterations. Any amendments, equivalent substitutions, improvements and the like should be encompassed within the protection scope of the present disclosure as long as they are within the spirit and principles of the present disclosure.

We claim:

1. A method of managing resources, comprising:
    receiving a request for a first amount of resources of a dedicated processing unit from an application with an assigned priority;
    determining, based on the request, a total amount of resources of the dedicated processing unit to be occupied by the application;
    in response to the total amount approximating or exceeding a predetermined quota associated with the priority, allocating the first amount of resources of a general-purpose processing unit to the application;

in response to the application releasing a portion of resources of the dedicated processing unit occupied previously, determining whether a total amount of resources of the dedicated processing unit occupied by the application after the releasing is below the predetermined quota by a threshold difference; and in response to the total amount of resources after the releasing being below the predetermined quota by the threshold difference, migrating at least a portion of data occupying the allocated resources of the general-purpose processing unit to the resources of the dedicated processing unit.

2. The method of claim 1, wherein the resources of the dedicated processing unit include storage resources of a Graphics Processing Unit (GPU), and the resources of the general-purpose processing unit include storage resources of a Central Processing Unit (CPU).

3. The method of claim 1, wherein the resources of the dedicated processing unit and the resources of the general-purpose processing unit have unified addressing by means of a shared pointer, and allocating the first amount of resources of the general-purpose processing unit comprises:

setting the shared pointer to point to the first amount of resources of the general-purpose processing unit allocated to the application; and returning information of the pointer to the application.

4. The method of claim 1, further comprising:

detecting utilization of resources of the dedicated processing unit; and in response to the utilization exceeding a predetermined threshold, sending a signal to the application to instruct the application to defer sending of a next request for the resources of the dedicated processing unit.

5. The method of claim 1, further comprising:

receiving an indication of the predetermined quota from the application.

6. The method of claim 1, wherein the total amount of resources of the dedicated processing unit to be occupied by the application comprises a sum of an amount of resources of the dedicated processing unit already occupied by the application plus the requested first amount of resources of the dedicated processing unit.

7. The method of claim 1, wherein the application is allocated either the first amount of resources of the dedicated processing unit or the first amount of resources of the general-purpose processing unit based at least in part on whether or not the total amount approximates or exceeds the predetermined quota associated with the priority.

8. A server system, comprising:

a dedicated processing unit;

a general-purpose processing unit; and a controller configured to:

receive a request for a first amount of resources of the dedicated processing unit from an application with an assigned priority;

determine, based on the request, a total amount of resources of the dedicated processing unit to be occupied by the application;

in response to the total amount approximating or exceeding a predetermined quota associated with the priority, allocate the first amount of resources of the general-purpose processing unit to the application;

in response to the application releasing a portion of resources of the dedicated processing unit occupied previously, determine whether a total amount of resources of the dedicated processing unit occupied by the application after the releasing is below the predetermined quota by a threshold difference; and in response to the total amount of resources after the releasing being below the predetermined quota by the threshold difference, migrate at least a portion of data occupying the allocated resources of the general-purpose processing unit to the resources of the dedicated processing unit.

9. The server system of claim 8, wherein the resources of the dedicated processing unit include storage resources of a Graphics Processing Unit (GPU), and the resources of the general-purpose processing unit include storage resources of a Central Processing Unit (CPU).

10. The server system of claim 8, wherein the resources of the dedicated processing unit and the resources of the general-purpose processing unit have unified addressing by means of a shared pointer, and allocating the first amount of resources of the general-purpose processing unit comprises:

setting the shared pointer to point to the first amount of resources of the general-purpose processing unit allocated to the application; and returning information of the pointer to the application.

11. The server system of claim 8, wherein the controller is further configured to:

detect utilization of resources of the dedicated processing unit; and in response to the utilization exceeding a predetermined threshold, send a signal to the application to instruct the application to defer sending of a next request for the resources of the dedicated processing unit.

12. The server system of claim 8, wherein the controller is further configured to:

receive an indication of the predetermined quota from the application.

13. The server system of claim 8, wherein the application is allocated either the first amount of resources of the dedicated processing unit or the first amount of resources of the general-purpose processing unit based at least in part on whether or not the total amount approximates or exceeds the predetermined quota associated with the priority.

14. A computer program product being tangibly stored on a non-volatile computer readable medium and including machine executable instructions which, when executed, cause a machine to perform a method of managing resources, the method comprising:

receiving a request for a first amount of resources of a dedicated processing unit from an application with an assigned priority;

determining, based on the request, a total amount of resources of the dedicated processing unit to be occupied by the application;

in response to the total amount approximating or exceeding a predetermined quota associated with the priority, allocating the first amount of resources of a general-purpose processing unit to the application;

in response to the application releasing a portion of resources of the dedicated processing unit occupied previously, determining whether a total amount of resources of the dedicated processing unit occupied by the application after the releasing is below the predetermined quota by a threshold difference; and in response to the total amount of resources after the releasing being below the predetermined quota by the threshold difference, migrating at least a portion of data occupying the allocated resources of the general-purpose processing unit to the resources of the dedicated processing unit.

15. The computer program product of claim 14, wherein the resources of the dedicated processing unit include storage resource of a Graphics Processing Unit (GPU), and the resources of the general-purpose processing unit include storage resources of a Central Processing Unit (CPU).

16. The computer program product of claim 14, wherein the resources of the dedicated processing unit and the resources of the general-purpose processing unit have unified addressing by means of a shared pointer, and allocating the first amount of resources of the general-purpose processing unit comprises:
   setting the shared pointer to point to the first amount of resources of the general-purpose processing unit allocated to the application; and
   returning information of the pointer to the application.

17. The computer program product of claim 14, wherein the method further comprises:
   detecting utilization of resources of the dedicated processing unit; and
   in response to the utilization exceeding a predetermined threshold, sending a signal to the application to instruct the application to defer sending of a next request for the resources of the dedicated processing unit.

18. The computer program product of claim 14, wherein the method further comprises:
   receiving an indication of the predetermined quota from the application.

19. The computer program product of claim 14, wherein the total amount of resources of the dedicated processing unit to be occupied by the application comprises a sum of an amount of resources of the dedicated processing unit already occupied by the application plus the requested first amount of resources of the dedicated processing unit.

20. The computer program product of claim 14, wherein the application is allocated either the first amount of resources of the dedicated processing unit or the first amount of resources of the general-purpose processing unit based at least in part on whether or not the total amount approximates or exceeds the predetermined quota associated with the priority.

* * * * *